Patented June 8, 1954

2,680,730

UNITED STATES PATENT OFFICE 2,680,730

ACETALS OF POLYHYDRIC ALCOHOLS

Elmore Louis Martin, Wilmington, Del., assignor to E. I. du Pont de Nemours and Company, Wilmington, Del., a corporation of Delaware No Drawing. Application July 5, 1950, Serial No. 172,191

9 Claims. (Cl. 260—66)

This invention relates to a new class of acetals of polyhydric alcohols with aromatic aldehydes. More particularly, it relates to acetals of cyanoacetylaryl ureido benzaldehydes and intermediates therefor. It also relates to photographic silver halide dispersions containing such aldehydes.

Polyhydric alcohol acetals of various amido derivatives of m-aminobenzaldehyde have been proposed heretofore for use in color photography. For example, outstanding magenta color-formers comprising a polyhydric alcohol acetal of a m-(5-acyloxypyrazole) amidobenzaldehyde are described in U. S. Patent 2,476,988. It has now been found that the acetals from a new and totally different type of amido derivative of m-aminobenzaldehyde are also exceptionally good magenta color-formers for chromogenic development of photographic elements.

The new products of this invention are the polyhydric alcohol acetals of a cyanoacetylaryl ureido benzaldehyde, and photographic silver halide emulsions comprising these acetals. More specifically, the chemical compounds of this invention are acetals, with monomeric or polymeric polyhydric alcohols, of aldehydes of the formula:

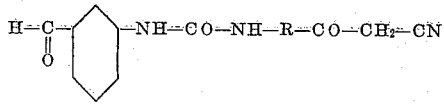

wherein R is a divalent cyclic radical, aromatic in character, whose terminal atoms are carbon.

In the compounds defined above the alcohol portion of the molecule, i. e., the portion acetalized with the cyanoacetylaryl ureido benzaldehyde, is preferably either a monomeric 1,2- or 1,3-alkanediol of 2 to 4 carbon atoms, or a hydroxyl polymer which is water-soluble to hydrophilic in character and contains a large number of recurring intralinear

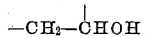

groups, e. g., polymeric vinyl alcohol itself, or a partly hydrolyzed polyvinyl ester, or a hydrolyzed interpolymer of vinyl esters with minor proportions of other vinyl compounds, but containing a large number of recurring intralinear

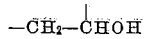

groups. The acetals of monomeric polyhydric alcohols may be used as such in photographic silver halide emulsions or dispersions containing a water-permeable colloid, e. g., gelatin, or they may be used as intermediates in the preparation of the acetals of polymeric vinyl alcohols, etc., the latter being used in photographic emulsions as both the color-former and the water-permeable binding agent for the silver halide grains.

The radical R in the above formula is a divalent cyclic radical having aromatic properties. Thus, it can be an aryl or substituted aryl radical or a heterocyclic radical which is aromatic in character, the latter forming a well-recognized chemical class (see, for example, Whitmore's "Organic Chemistry," pages 874–875, published by D. Van Nostrand and Company, New York, N. Y., 1937).

The acetals of this invention may be prepared in various ways. One method, illustrated in Examples I–VI and VIII–XII below, comprises the following steps: (1) reacting a carboalkoxyarylamine with phosgene to give a carboalkoxyaryl isocyanate (I); (2), reacting the carboalkoxyaryl isocyanate (I) with a monomeric acetal of m-aminobenzaldehyde to give the corresponding acetal of a carboalkoxyaryl ureido benzaldehyde (II); (3), reacting II with acetonitrile in the presence of an alkaline condensing agent to give a monomeric acetal of a cyanoacetylaryl ureido benzaldehyde (III); and (4), reacting III with a hydroxyl polymer containing a large number of recurring intralinear

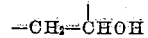

groups, e. g., polyvinyl alcohol under acetal-forming conditions to give the polymeric acetal of a cyanoacetylaryl ureido benzaldehyde. The above steps are shown schematically by the following equations, using methyl m-aminobenzoate, the ethylene glycol acetal of m-aminobenzaldehyde and polyvinyl alcohol as illustrative reactants:

1.

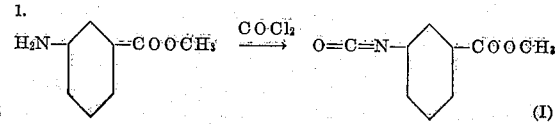

2.

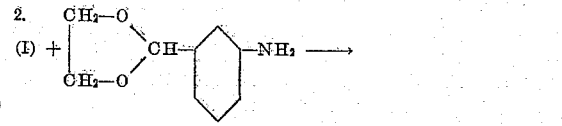

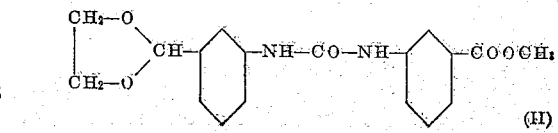

3.

(II) + CH₃CN —alkali→

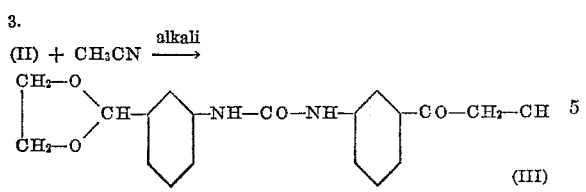

4.

(III) + (—CH₂—ĊHOH)ₙ —→

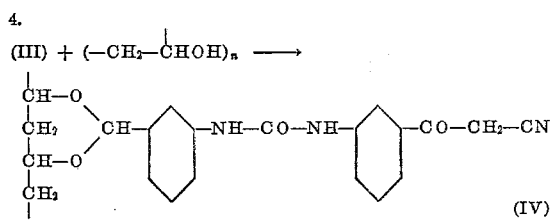

Another method, illustrated in Example VII below, comprises the following steps: (1), reacting a cyanoacetylarylamine with phosgene to give a cyanoacetylaryl isocyanate (V); (2), reacting the cyanoacetylaryl isocyanate (V) with a monomeric acetal of m-aminobenzaldehyde to give a monomeric acetal of a cyanoacetylaryl ureido benzaldehyde (III); and (3), reacting III with a polyvinyl alcohol as in step 4 of the first mentioned procedure.

Compounds III and IV are important and preferred final products of this invention, i. e., the polyhydric alcohol acetals of a cyanoacetylaryl ureido benzaldehyde. Compounds I, II and V are also new compounds of the invention, not previously described.

The invention is illustrated in greater detail by the following examples, in which parts are by weight unless otherwise noted.

EXAMPLE I

A. Methyl 4-chloro-3-nitrobenzoate

To a mechanically stirred solution of 510 parts of methyl p-chlorobenzoate in 1840 parts of sulfuric acid (sp. gr. 1.84) there was slowly added a mixture of 435 parts of sulfuric acid (sp. gr. 1.84) and 335 parts of nitric acid (sp. gr. 1.42), the temperature being maintained at 8–10° C. by means of external cooling. The mixture was stirred at 8–10° C. for an additional thirty minutes and poured onto an excess of ice. After stirring for about thirty minutes, the mixture was filtered, the filter cake was washed essentially free of mineral acid by means of cold water and crystallized from methanol. There was obtained 617 parts of methyl 4-chloro-3-nitrobenzoate in the form of faintly yellow crystals melting at 80–82° C.

B. Methyl 3-amino-4-chlorobenzoate

A mechanically stirred slurry of 440 parts of iron powder in 800 parts of water was heated to 90° C. and 45 parts of hydrochloric acid (sp. gr. 1.18) was added. The resulting suspension was heated to 100° C. and 432 parts of methyl 4-chloro-3-nitrobenzoate was added in small portions as rapidly as the exothermic reaction would permit. The mixture was refluxed for an additional thirty minutes after the addition of the nitro compound was complete. The pH of the reaction mixture was adjusted to a value of about 8 with a 25 percent solution of potassium carbonate and then the mixture was diluted with 2000 parts of methanol. The reaction mixture was filtered and the filter cake extracted several times with hot methanol. Concentration of the combined filtrates under reduced pressure gave 368 parts of methyl 3-amino-4-chlorobenzoate, melting point 82–83° C.

C. 5-carbomethoxy-2-chlorophenyl isocyanate

To a solution of 100 parts of ethyl acetate saturated with phosgene at room temperature there was added during the course of about two hours a solution of 112 parts of the above methyl 3-amino-4-chlorobenzoate in 350 parts of ethyl acetate, the passage of phosgene being continued during the addition of the amino compound. The temperature was gradually increased to 75–78° C. during which time hydrogen chloride and excess phosgene were allowed to escape. The ethyl acetate was removed as completely as possible on a steam bath and the residue was fractionated under reduced pressure. There was obtained 123 parts of 5-carbomethoxy-2-chlorophenyl isocyanate, B. P. 122–125° C. at 1 mm., which solidified on cooling and melted at 78–81° C.

D. m-[3-(5-carbomethoxy-2-chlorophenyl)ureido]-benzaldehyde ethylene glycol acetal To a solution of 123 parts of 5-carbomethoxy-2-chlorophenyl isocyanate in 500 parts of anhydrous ether there was added a solution of 99 parts of m-aminobenzaldehyde ethylene glycol acetal as rapidly as the exothermic reaction would permit. After refluxing for ten minutes, the reaction product was collected, washed with ether, and freed of solvent under reduced pressure. There was obtained 218 parts of m-[3-(5-carbomethoxy-2-chlorophenyl)ureido]benzaldehyde ethylene glycol acetal as colorless crystals, M. P. 168–170° C.

E. m-[3(5-cyanoacetyl-2-chlorophenyl)ureido]-benzaldehyde ethylene glycol acetal A mechanically stirred mixture of 230 parts of m-[3-(5-carbomethoxy-2-chlorophenyl)-ureido]benzaldehyde ethylene glycol acetal, 100 parts of sodium methylate, 500 parts of anhydrous acetonitrile, and 500 parts of anhydrous dioxane was heated at a gentle reflux for a total of twelve hours. The thick reaction mixture was poured onto excess ice and the solution was filtered from a small amount of insoluble material. To the filtrate was added 25 parts of sodium bicarbonate and the solution was treated with acetic acid until carbon dioxide began to be evolved. The precipitated m-[3-(5-cyanoacetyl-2-chlorophenyl)ureido]benzaldehyde ethylene glycol acetal was collected, washed thoroughly with water and air dried. Crystallization from acetonebenzene gave colorless needles, M. P. 199–201° C. The compound has the formula:

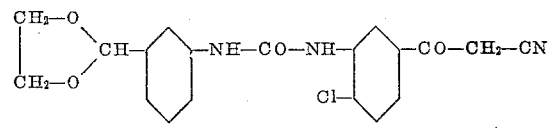

Analysis:
Calculated for C₁₉H₁₆O₄N₃Cl__ N, 10.90; Cl, 9.19
Found _____ N, 10.93; Cl, 9.05; 9.07

F. m-[3-(5-cyanoacetyl-2-chlorophenyl)ureido]-benzaldehyde polyvinyl acetal

Into a mechanically stirred mixture of 100 parts of polyvinyl alcohol, 22 parts of m-[3-(5-cyanoacetyl-2-chlorophenyl)ureido]benzaldehyde ethylene glycol acetal, five parts of o-sulfobenzaldehydesodium salt, 660 parts of ethylene glycol and 60 parts of dioxane heated to 69–70° C. was passed dry sulfur dioxide until the mixture was saturated. The weight gain was 38 parts. At the end of 45 minutes, the mixture was cooled, diluted with 2000 parts of a mixture of equal parts of acetone and methanol, the polyvinyl acetal was collected, washed with acetone and slurried twice with 2000 parts of acetone. The yield of dried polyvinyl mixed acetal of m-[3-(5-cyanoacetyl-2-chlorophenyl)-ureido]benzaldehyde and o-sulfobenzaldehyde was 120 parts.

G. *Photographic emulsion containing m-[3-(5-cyanoacetyl - 2 - chlorophenyl) ureido]benzaldehyde polyvinyl acetal*

To ten parts of m-[3-(5-cyanoacetyl-2-chlorophenyl) ureido]benzaldehyde polyvinyl acetal modified by further acetalization with o-sulfobenzaldehyde after the manner described in this section F was added 50 parts of ethanol, 150 parts of water and 0.5 part of a 10 percent solution of sodium carbonate. After heating with stirring at 70–75° C. for 15 minutes, a homogeneous solution was obtained which was cooled to room temperature and used to prepare a silver halide emulsion under conditions which did not cause fogging or exposure of the sensitive silver salts, as follows.

To 75 parts of the above solution there was added 25 parts of ethanol and at 50° C. there was added separately and in equal portions during the course of 10 minutes a mixture of 31 parts of 3 N ammonium bromide solution, 2 parts of 0.5 N potassium iodide solution, and 32 parts of water, together with a mixture of 29 parts of 3 N silver nitrate solution, 29 parts of a 20% ammonium hydroxide solution, and 7 parts of water. After stirring for a total of 30 minutes, the silver halide dispersion in the polymeric acetal which had formed was run into 250 parts of a 15% sodium sulfate solution. The precipitated silver halide-color-forming dispersion was collected, pressed into a thin film, cut into small pieces, and washed for one-half hour in running water, after which the excess water was drained off. Thirty parts of ethanol and 20 parts of water were added and the mixture stirred at 65–70° C. for 15 minutes. The remainder of the original polyvinyl acetal solution was added and the mixture was stirred for an additional five minutes. After cooling to 30° C., the emulsion was coated on film base. The resulting photographic film was exposed to form latent images, then developed in a solution made by mixing the following components:

| | Parts |
|---|---|
| p-Aminodiethylaniline hydrochloride | 2.5 |
| Sodium sulfite (anhydrous) | 10.0 |
| Sodium carbonate (monohydrate) | 20.0 |
| Potassium bromide | 2.0 |
| Water to make | 1000.0 |

The film was then fixed in 25% sodium thiosulfate solution, washed, bleached in a 4% potassium ferricyanide solution, washed, fixed in a 25% sodium thiosulfate solution and washed. The resulting film contained a bright, strong magenta negative image.

EXAMPLE II

A. *Methyl 2-chloro-5-nitrobenzoate*

Nitration of 256 parts of methyl 2-chlorobenzoate dissolved in 740 parts of sulfuric acid with a mixed acid perpared from 200 parts of sulfuric acid and 160 parts of nitric acid essentially as described in Example I, section A, gave 280 parts of methyl 2-chloro-5-nitrobenzoate melting at 60–63° C. after crystallization from methanol.

B. *Methyl 5-amino-2-chlorobenzoate*

Reduction of 215 parts of methyl 2-chloro-5-nitrobenzoate essentially as described in Example I, section B, gave 176 parts of methyl 5-amino-2-chlorobenzoate boiling at 155–160° C. at 2 mm.

C. *5-carbomethoxy-4-chlorophenyl isocyanate*

The slow addition of an ethyl acetate solution of 93 parts of the above amino ester to a solution of phosgene in ethyl acetate essentially as described in Example I, section C, gave 102 parts of 5-carbomethoxy-4-chlorophenyl isocyanate boiling at 130–133° C. at 3 mm.

D. *m-[3-(5-carbomethoxy-4-chlorophenyl)-ureido]-benzaldehyde ethylene glycol acetal*

The addition of an ethereal solution of 33 parts of m-aminobenzaldehyde ethylene glycol acetal to an ethereal solution of 42 parts of the above isocyanate gave 75 parts of m-[3-(5-carbomethoxy-4-chlorophenyl)-ureido]benzaldehyde ethylene glycol acetal, M. P. 169–171° C.

E. *m-[3-(5-cyanoacetyl-4-chlorophenyl) ureido]-benzaldehyde ethylene glycol acetal*

A mixture of 95 parts of the above ester, 200 parts of acetonitrile and 36 parts of sodium methylate was refluxed gently with mechanical stirring for three hours. Isolation of the reaction product essentially as described in Example I, section E, gave 40 parts of m-[3-(5-cyanoacetyl-4-chlorophenyl) ureido]benzaldehyde ethylene glycol acetal, M. P. 158–160° C., after crystallization from acetone-benzene. The compound has the formula:

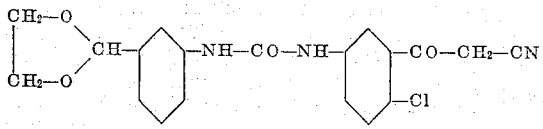

Analysis:
Calcd. for $C_{19}H_{16}O_4N_3Cl$ ____ C, 59.13; H, 4.18; Cl, 9.19
Found _____ C, 59.57; H, 4.27; Cl, 9.43

F. *m-[3-(5-cyanoacetyl-4-chlorophenyl) ureido]-benzaldehyde polyvinyl acetal*

A mixture of 65 parts of ethylene glycol, 1 part of 92% phosphoric acid, 0.6 part of o-sulfo-benzaldehyde sodium salt, 10 parts of polyvinyl alcohol, and 2 parts of the above cyanoacetyl acetal was stirred at 65° C. for 30 minutes. The cyanoacetyl-containing color-forming polyvinyl acetal was isolated essentially as described in Example I, section F. The color-forming polyvinyl acetal was obtained as a colorless product readily soluble in aqueous ethanol.

G. *Photographic emulsion using m-[3-(5-cyanoacetyl - 4 - chlorophenyl) ureido]benzaldehyde polyvinyl acetal*

Ten (10) parts of the above color-forming polyvinyl acetal was dissolved in a mixture of 50 parts of ethanol, 150 parts of water and 0.5 part of a 10% sodium carbonate solution essentially as described in Example I, section G. The preparation of the silver halide emulsion, precipitation, washing, redispersing, coating and processing were carried out essentially as described in Example I, section G. This color-forming polyvinyl acetal yielded a brilliant, strong magenta negative image.

EXAMPLE III

A. *Methyl 2,4-dichloro-5-nitrobenzoate*

Nitration of 205 parts of methyl 2,4-dichlorobenzoate essentially as described in Example I, section A, gave 232 parts of methyl 2,4-dichloro-5-nitrobenzoate, M. P. 54–56° C.

B. *Methyl 5-amino-2,4-dichlorobenzoate*

Reduction of the above nitro ester with iron essentially as described in Example I, section B, gave methyl 5-amino-2,4-dichlorobenzoate, M. P. 104–106° C.

C. *5-carbomethoxy-2,4-dichlorophenyl isocyanate*

The addition of an ethyl acetate solution of the above amino ester (98 parts) to an ethyl acetate solution of phosgene essentially as described in Example I, section C, gave 95 parts of 5-carbomethoxy-2,4-dichlorophenyl isocyanate, B. P. 165–170° C. at 12 mm., M. P. 66–68° C.

D. *m - [3 - (5 - carbomethoxy - 2,4 - dichlorophenyl) ureido]-benzaldehyde ethylene glycol acetal*

The addition of 49 parts of the above isocyanate in ether to 35 parts of m-aminobenzaldehyde ethylene glycol acetal in ether gave 81 parts of m - [3 - (5 - carbomethoxy - 2,4 - dichlorophenyl) ureido]benzaldehyde ethylene glycol acetal, M. P. 173–175° C.

Analysis:
Calcd. for $C_{18}H_{16}O_5N_2Cl_2$ _____ Cl, 17.25
Found _____ Cl, 16.93; 17.11

E. *m - [3 - (5 - cyanoacetyl - 2,4 - dichlorophenyl) ureido]-benzaldehyde ethylene glycol acetal*

A mixture of 70 parts of the above ester, 125 parts of acetonitrile and 24 parts of sodium methylate was stirred at gentle reflux for one hour. The reaction product was isolated essentially as described in Example I, section E. Crystallization from acetone-benzene gave 20 parts of colorless, felt-like needles, M. P. 185–187° C. The compound has the formula:

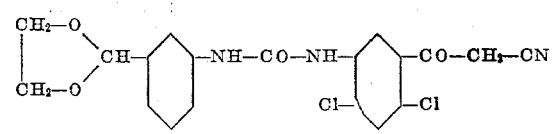

Analysis:
Calcd. for $C_{19}H_{15}O_4N_3Cl_2$ _____ Cl, 16.88
Found _____ Cl, 17.00; 17.03

F. *m - [3 - (5 - cyanoacetyl - 2,4 - dichlorophenyl) ureido]-benzaldehyde polyvinyl acetal*

A mixture of 10 parts of polyvinyl alcohol, 2 parts of the above cyanoacetyl acetal, 0.6 part of o-sulfobenzaldehyde sodium salt, 65 parts of ethylene glycol, 7 parts of dioxane and one part of 92% phosphoric acid was slurried at 75° C. for 40 minutes. The color-forming polyvinyl acetal was isolated essentially as described in Example I, section F.

G. *Photographic emulsion using m-[3-(5-cyanoacetyl - 2,4 - dichlorophenyl) ureido]benzaldehyde polyvinyl acetal*

A 5% solution of the above polyvinyl acetal was prepared and used to prepare a silver halide emulsion essentially as described in Example I, section G. Processing the exposed photographic film gave a strong magenta negative image.

EXAMPLE IV

A. *Methyl 4-methyl-3-nitrobenzoate*

The nitration of 150 parts of methyl p-toluate essentially as described in Example I, section A, gave 120 parts of methyl 4-methyl-3-nitrobenzoate after crystallization from methanol.

B. *Methyl 3-amino-4-methylbenzoate*

The iron reduction of 170 parts of the above nitro ester essentially as described in Example I, section B, gave 136 parts of methyl 3-amino-4-methylbenzoate, M. P. 114–116° C.

C. *5-carboxymethoxy-2-methylphenyl isocyanate*

Following the procedure given in Example I, section C, 112 parts of the above amino ester gave 110 parts of 5-carbomethoxy-2-methylphenyl isocyanate, M. P. 78–81° C.

D. *m - [3 - (5 - carbomethoxy - 2 - methylphenyl) ureido]-benzaldehyde ethylene glycol acetal*

According to the procedure given in Example I, section D, 38 parts of the above isocyanate and 33 parts of m-aminobenzaldehyde ethylene glycol acetal gave 62 parts of m-[3-(5-carbomethoxy-2 - methylphenyl) ureido]benzaldehyde ethylene glycol acetal.

E. *m - [3 - (5 - cyanoacetyl - 2 - methylphenyl) ureido]benzaldehyde ethylene glycol acetal*

A mixture of 36 parts of the above acetal ester, 125 parts of acetonitrile and 11 parts of sodium methylate was stirred at gentle reflux for four hours. Isolation of the reaction product essentially as described in Example I, section E, gave 6 parts of m-[3-(5-cyanoacetyl-2-methylphenyl) ureido]benzaldehyde ethylene glycol acetal, M. P. 189–191° C. The compound has the formula:

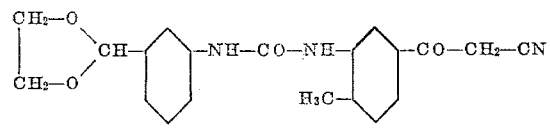

F. *m - [3 - (5 - cyanoacetyl - 2 - methylphenyl) ureido]benzaldehyde polyvinyl acetal*

A mixture of 2 parts of the above cyanoacetyl acetal, 10 parts of polyvinyl alcohol, 65 parts of ethylene glycol, 10 parts of dioxane, 1 part of 92% phosphoric acid and 0.6 part of o-sulfobenzaldehyde sodium salt was stirred at 80° C. for 30 minutes. The color-forming polyvinyl acetal was isolated essentially as described in Example I section F.

G. *Photographic emulsion using m-[3-(5-cyanoacetyl - 2 - methylphenyl) ureido]benzaldehyde polyvinyl acetal*

A 5% solution of the above polyvinyl acetal in ethanol-water was prepared and used to prepare a silver halide emulsion essentially as described in Example I, section G. The redispersed, washed silver halide-color-former emulsion was coated on film base and the exposed photographic film processed with the developer given in Example I, section G. A brilliant, magenta negative image was obtained.

EXAMPLE V

A. *Methyl 4-methoxy-3-nitrobenzoate*

Nitration of 248 parts of methyl p-anisate essentially as described in Example I, section A, gave 290 parts of methyl 4-methoxy-3-nitrobenzoate after crystallization from methanol.

B. *Methyl 3-amino-4-methoxybenzoate*

Iron powder reduction of 190 parts of the above nitro ester essentially as described in Example I, section B, gave 154 parts of the amino ester, M. P. 88–90° C.

C. *5-carbomethoxy-2-methoxyphenyl isocyanate*

Following the general procedure outlined in Example I, section C, there was obtained 60 parts of 5-carbomethoxy-2-methoxyphenyl isocyanate, M. P. 115–117° C. from 54 parts of the amino ester.

D. *m - [3 - (5 - carbomethoxy - 2 - methoxyphenyl) ureido]benzaldehyde ethylene glycol acetal*

From 31 parts of the above isocyanate and 25 parts of m-aminobenzaldehyde ethylene glycol acetal, there was obtained 45 parts of m-[3-(5-carbomethoxy - 2 - methoxyphenyl) ureido]benzaldehyde ethylene glycol acetal, M. P. 161–163° C. when the reaction was carried out essentially as described in Example I, section D.

E. *m-[3-(5-cyanoacetyl-2-methoxyphenyl) ureido]-benzaldehyde ethylene glycol acetal*

A mixture of 45 parts of the above acetal ester, 125 parts of acetonitrile, 50 parts of dioxane and 13 parts of sodium methylate was stirred under gentle reflux for six hours. Isolation of the reaction product essentially as described in Example I, section E, gave 6 parts of m-[3-(5-cyanoacetyl-2-methoxyphenyl)-ureido]benzaldehyde ethylene glycol acetal as colorless crystals, M. P. 193–195° C., on crystallization from acetone-benzene. The compound has the formula:

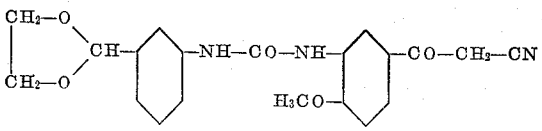

F. *m-[3-(5-cyanoacetyl-2-methoxyphenyl) ureido]-benzaldehyde polyvinyl acetal*

A mixture of 2 parts of the above cyanoacetyl acetal, 10 parts of polyvinyl alcohol, 0.6 part of o-sulfobenzaldehyde sodium salt, 65 parts of ethylene glycol, 10 parts of dioxane and 1 part of 92% phosphoric acid was slurried at 78° C. for 30 minutes. The color-forming polyvinyl acetal was isolated essentially as described in Example I, section F.

G. *Photographic emulsion using m-[3-(5-cyanoacetyl-2-methoxyphenyl) ureido]benzaldehyde polyvinyl acetal*

A 5% solution of the above color-forming polyvinyl acetal in ethanol-water was used to prepare a silver halide emulsion essentially as described in Example I, section G. After coagulating and washing in running water, the silver halide color-forming polyvinyl acetal was redispersed and coated on film base according to the procedure given in Example I, section G. Processing a piece of the exposed photographic film according to the method outlined in Example I, section G, gave a beautiful, strong magenta negative image.

EXAMPLE VI

A. *Methyl 3-nitrobenzoate*

This nitro ester was prepared according to the procedure given in Organic Syntheses, Coll. vol. I, p. 372.

B. *Methyl 3-aminobenzoate*

Iron reduction of 362 parts of the above nitro ester essentially as described in Example I, section B, gave 286 parts of methyl 3-aminobenzoate, B. P. 135–140° C. at 2 mm., M. P. 48–50° C.

C. *3-carbomethoxyphenyl isocyanate*

Following the procedure outlined in Example I, section C, 75 parts of the above amino ester gave 84 parts of 3-carbomethoxyphenyl isocyanate, B. P. 125–128° C./10 mm.

D. *m-[3-(3-carbomethoxyphenyl) ureido]benzaldehyde ethylene glycol acetal*

From 35 parts of the above isocyanate and 33 parts of m-aminobenzaldehyde ethylene glycol acetal there was obtained 68 parts of m-[3-(3-carbomethoxyphenyl) ureido]benzaldehyde ethylene glycol acetal, M. P. 169–171° C., when the reaction was carried out essentially as described in Example I, section D.

E. *m-[3-(3-cyanoacetylphenyl) ureido]benzaldehyde ethylene glycol acetal*

A mixture of 68 parts of the above acetal ester, 150 parts of acetonitrile, 36 parts of sodium methylate and 50 parts of dioxane was stirred and heated at gentle reflux for four hours. Isolation of the product as described in Example I, section E, gave 20 parts of colorless crystals after crystallization from acetone-benzene which melted at 169–171° C. The compound has the formula:

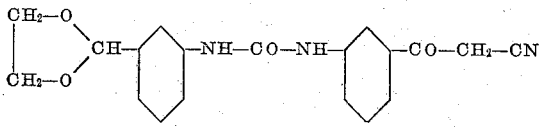

Analysis:
Calcd. for $C_{19}H_{17}O_4N_3$ ------ C, 64.94; H, 4.88; N, 11.97
Found ------------------ C, 64.61; H, 4.74; N, 11.86

F. *m-[3-(3-cyanoacetylphenyl) ureido]benzaldehyde polyvinyl acetal*

A mixture of 2 parts of the above cyanoacetyl acetal, 10 parts of polyvinyl alcohol, 0.6 part of o-sulfobenzaldehyde sodium salt, 65 parts of ethylene glycol, 5 parts of dioxane and 1 part of 92% phosphoric acid was heated at 65° C. for 30 minutes. The color-forming polyvinyl acetal was isolated essentially as described in Example I, section F.

G. *Photographic emulsion using m-[3-(3-cyanoacetylphenyl) ureido] benzaldehyde polyvinyl acetal*

A 5% solution of the above polyvinyl acetal in ethanol-water was used to prepare a silver halide emulsion essentially as described in Example I, section G. After coagulating and washing in running water, the silver halide-color-forming polyvinyl acetal was redispersed and coated on film base according to the procedure given in Example I, section G. Processing a piece of the exposed photographic film according to the outline given in Example I, section G, gave a strong magenta negative image.

EXAMPLE VII

A. *p-Cyanoacetylaniline*

This compound was prepared as follows: A mixture of 125 parts of p-chloroacetylacetanilide, 200 parts of concentrated hydrochloric acid and 125 parts of water was boiled gently until a homogeneous solution was obtained. The resulting solution was filtered and the filtrate neutralized with sodium bicarbonate. The p-chloroacetylaniline which had precipitated was collected and crystallized from methanol. There was obtained 92 parts of p-chloroacetylaniline. M. P. 146–148° C.

A mixture of 17 parts of p-chloroacetylaniline, 33 parts of potassium cyanide, 75 parts of water and 75 parts of methanol was warmed to about 50° C., whereupon an exothermic reaction started. The temperature was maintained below 55° C. by means of external cooling. After 5 minutes at 50–55° C., the reaction mixture was poured onto ice, filtered, and the filtrate was carefully acidified with hydrochloric acid. The precipitate which formed was collected, washed with water and crystallized from 750 parts of hot water. There was obtained 6.3 parts of p-cyanoacetylaniline, M. P. 157–159° C.

B. *4-cyanoacetylphenyl isocyanate*

To 50 parts of ethyl acetate saturated with phosgene at room temperature was added slowly a solution of 6.3 parts of 4-cyanoacetylaniline in 150 parts of ethyl acetate. The mixture was gradually heated to gentle reflux and the resulting solution was concentrated to a small volume on a steam bath. A small amount of anhydrous ether was added, whereupon colorless crystals separated immediately. After washing thoroughly, the crystals were collected and dried. The yield of 4-cyanoacetylphenyl isocyanate melting at 95–97° C. was 6.2 parts.

C. *m-[3-(4-cyanoacetylphenyl)ureido]benzaldehyde ethylene glycol acetal*

To a solution of 3.72 parts of the above cyanoacetyl isocyanate in 40 cc. of anhydrous benzene was added a solution of 3.3 parts of m-aminobenzaldehyde ethylene glycol acetal in 15 parts of anhydrous ether. The urea derivative separated immediately, was collected, washed with ether and crystallized from acetone-benzene. There was obtained 5.9 parts of colorless crystals, M. P. 202–203° C. The compound has the formula

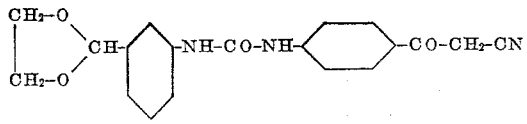

Analysis:
Calcd. for $C_{19}H_{17}O_4N_3$____ C, 64.92; H, 4.88; N, 11.97
Found _____ C, 64.83; H, 4.85; N, 12.04; 12.11

D. *m-[3-(4-cyanoacetylphenyl)ureido]benzaldehyde polyvinyl acetal*

A mixture of 10 parts of polyvinyl alchol, 2 parts of the above cyanoacetyl acetal, 0.2 part of o-sulfobenzaldehyde sodium salt, 65 parts of ethylene glycol and 0.9 part of 92% phosphoric acid was stirred at 72–74° C. for 45 minutes. The color-forming polyvinyl acetal was isolated essentially as described in Example I, section F. The yield of colorless, color-forming polyvinyl acetal was 11.9 parts.

E. *Photographic emulsion using m-[3-(4-cyanoacetylphenyl)ureido]benzaldehyde polyvinyl acetal*

A 5% solution of the above polyvinyl acetal in ethanol-water was used to prepare a silver halide emulsion essentially as described in Example I, section G. After coagulating and washing in running water, the silver halide-color-forming polyvinyl acetal was redispersed and coated on film base according to the procedure given in Example I, section G. Processing a piece of the exposed photographic film according to the outline given in Example I, section G, gave a strong magenta negative image.

EXAMPLE VIII

A. *Methyl 3-nitro-4-phenylmercaptobenzoate*

To a solution of 20 parts of sodium methylate in 250 parts of methanol was added 33 parts of thiophenol followed by the addition of 70 parts of methyl 4-chloro-3-nitrobenzoate. The chloro ester dissolved rapidly and presently the phenylmercapto-substituted ester crystallized from the reaction mixture. The mixture was refluxed for 15 minutes, cooled and diluted with water. The bright yellow crystals were collected, washed with water and dried. The yield of methyl 3-nitro-4-phenylmercaptobenzoate, melting at 111–113° C., was 98 parts. Crystallization from methanol gave stout yellow needles melting at 112–113° C.

Analysis:
Calcd. for $C_{14}H_{11}O_4NS$_____ S, 11.08
Found _____ S, 10.66; 10.71

B. *Methyl 3-amino-4-phenylmercaptobenzoate*

Iron powder reduction of 116 parts of the above nitro ester essentially as described in Example I, section B, gave 90 parts of the methyl 3-amino-4-phenylmercaptobenzoate, B. P. 195–200° C. at 2 mm., M. P. 58–60° C.

C. *2-phenylmercapto-5-carbomethoxyphenyl isocyanate*

Following the procedure outlined in Example I, section C, 51 parts of the above amino ester gave 57 parts of 2-phenylmercapto-5-carbomethoxyphenyl isocyanate, B. P. 185–190° C. at 2 mm., M. P. 40–45° C.

D. *m-[3-(2-phenylmercapto-5-carbomethoxyphenyl)ureido]benzaldehyde ethylene glycol acetal*

Twenty-nine (29) parts of the above isocyanate and 17 parts of m-aminobenzaldehyde ethylene glycol acetal gave 45 parts of m-[3-(2-phenylmercapto-5-carbomethoxyphenyl)ureido]benzaldehyde ethylene glycol acetal when the reaction was carried out essentially as described in Example I, section D. The compound melted at 166–169° C.

Analysis:
Calcd. for $C_{24}H_{22}O_6N_2S$_____ S, 7.12
Found _____ S, 6.80; 6.81

E. *m-[3-(2-phenylmercapto-5-cyanoacetylphenyl)ureido]benzaldehyde ethylene glycol acetal*

A mixture of 45 parts of the above acetal ester, 100 parts of acetonitrile, and 15 parts of sodium methylate was stirred and heated at gentle reflux for 0.5 hour. The cyanoacetyl acetal was isolated essentially as described in Example I, section E. Crystallization from acetonemethanol gave 20 parts of colorless crystals, M. P. 181–182° C. The compound has the formula

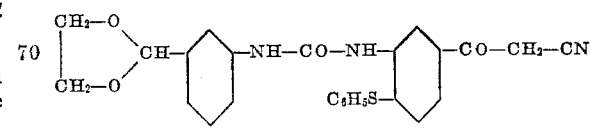

Analysis:
Calcd. for $C_{25}H_{21}O_4N_3S$_____ N, 9.15; S, 6.98
Found _____ N, 9.17; S, 6.81

F. *m - [3 - (2 - phenylmercapto - 5 - cyanoacetylphenyl) ureido] - benzaldehyde polyvinyl acetal*

A mixture of 2 parts of the above cyanoacetyl acetal, 10 parts of polyvinyl alcohol, 0.6 part of o-sulfobenzaldehyde sodium salt, 65 parts of ethylene glycol, 12 parts of dioxane and 1 part of 92% phosphoric acid was stirred at 80° C. for 30 minutes. The color-forming polyvinyl acetal was isolated essentially as described in Example I, section F.

G. *Photographic emulsion using m-[3-(2-phenylmercapto - 5 - cyanoacetylphenyl) ureido] benzaldehyde polyvinyl acetal*

A 5% solution of the above polyvinyl acetal in ethanol-water was used to prepare a silver halide emulsion essentially as described in Example I, section G. After coagulating and washing in running water, this silver halide-color-forming polyvinyl acetal was redispersed and coated on film base according to the procedure outlined in Example I, section G. Processing a piece of the exposed photographic film according to the outline in Example I, section G, yielded a strong magenta negative image.

EXAMPLE IX

A. *Dimethyl 5-nitro-isophthalate*

To a solution of 97 parts of dimethyl isophthalate in 370 parts of sulfuric acid at 10° C. was added 100 parts of fuming sulfuric acid containing 25% free sulfur trioxide. A mixture of 70 parts of fuming nitric acid and 60 parts of sulfuric acid was added at 15° C. and the mixture was held at 15° C. for 20 minutes. The reaction mixture was allowed to warm to 30° C., finally warmed to 50° C. and maintained at 50–55° C. for 15 minutes. After cooling, the mixture was poured onto excess ice, the nitro ester collected, washed well with cold water and crystallized from methanol. The yield of dimethyl 5-nitro-isophthalate, melting at 118–121° C., was 105 parts.

B. *Dimethyl 5-aminoisophthalate*

Iron powder reduction of 24 parts of the above nitro ester essentially as described in Example I, section B, gave 16 parts of dimethyl 5-aminoisophthalate, M. P. 176–178° C.

C. *3,5-bis(carbomethoxy) phenyl isocyanate*

Following the procedure outlined in Example I, section C, 16 parts of the above amino ester gave 16 parts of 3,5-bis(carbomethoxy) phenyl isocyanate, M. P. 104–106° C.

D. *m-[3-(3,5-bis(carbomethoxy) phenyl)- ureido]benzaldehyde ethylene glycol acetal*

From 16 parts of the above isocyanate and 12 parts of m-aminobenzaldehyde ethylene glycol acetal there was obtained 28 parts of m-[3-(3,5-bis - (carbomethoxy) phenyl) ureido]benzaldehyde ethylene glycol acetal, M. P. 173–175° C., when the reaction was carried out essentially as described in Example I, section D.

E. *m - [3 - (3 - carbomethoxy - 5 - cyanoacetylphenyl) ureido]benzaldehyde ethylene glycol acetal*

A mixture of 28 parts of the above diester acetal, 100 parts of acetonitrile and 9 parts of sodium methylate was stirred and heated at gentle reflux for 2 hours. Isolation of the product as described in Example I, section E, gave 4 parts of m-[3-(3-carbomethoxy-5-cyanoacetylphenyl)-ureido]benzaldehyde ethylene glycol acetal, M. P. 180–182° C. The compound has the formula

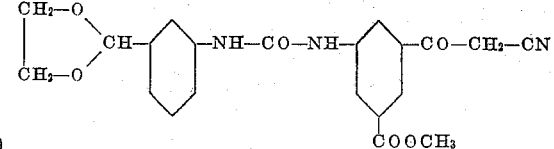

F. *m - [3-(3-carbomethoxy-5-cyanoacetylphenyl) ureido]benzaldehyde polyvinyl acetal*

A mixture of 1 part of the above cyanoacetyl acetal, 5 parts of polyvinyl alcohol, 0.3 part of o-sulfobenzaldehyde sodium salt, 40 parts of ethylene glycol and 0.5 part of 92% phosphoric acid was stirred at 65° C. for 45 minutes. The color-forming polyvinyl acetal was isolated essentially as described in Example I, section F.

G. *Photographic emulsion using m-[3-(3-carbomethoxy - 5 - cyanoacetylphenyl) ureido]- benzaldehyde polyvinyl acetal*

A 5% solution of the above polyvinyl acetal in ethanol-water was used to prepare a silver halide emulsion essentially as described in Example I, section G. After coagulating and washing in running water, the silver halide-color-forming polyvinyl acetal was redispersed and coated on film base according to the procedure given in Example I, section G. Processing a piece of the exposed photographic film according to the outline given in Example I, section G, gave a strong magenta negative image.

EXAMPLE X

A. *Methyl 5-nitro-benzofuran-2-carboxylate*

The nitration of 80 parts of methyl benzofuran-2-carboxylate essentially as described in Example I, section A, gave 78 parts of methyl 5-nitro-benzofuran-2-carboxylate, M. P. 128–130° C., after crystallization from ethanol.

B. *Methyl 5-amino-benzofuran-2-carboxylate*

Iron powder reduction of 35 parts of the above nitro ester essentially as described in Example I, section B, gave 16 parts of methyl 5-amino-benzofuran-2-carboxylate, M. P. 180–183° C.

C. *2-carbomethoxy-5-benzofuran isocyanate*

Following the procedure outlined in Example I, section C, 48 parts of the above amino ester gave 48 parts of 2-carbomethoxy-5-benzofuran isocyanate, B. P. 160–165° C. at 2 mm., M. P. 98–100° C.

Analysis:
  Calcd. for $C_{11}H_7O_4N$_____ C, 60.80; H, 3.25; N, 6.45
  Found _____ C, 60.93; H, 3.30; N, 6.25

D. *m - [3 - (2 - carbomethoxy - 5 - benzofuran) - ureido]benzaldehyde ethylene glycol acetal*

Forty-eight (48) parts of the above isocyanate and 36 parts of m-aminobenzaldehyde ethylene glycol acetal gave 72 parts of m-[3-(2-carbomethoxy-5-benzofuran) ureido]benzaldehyde ethylene glycol acetal, M. P. 184–187° C., when the reaction was carried out essentially as described in Example I, section D.

Analysis:
  Calcd. for $C_{20}H_{18}O_6N_2$_____ C, 62.80; H, 4.75; N, 7.33
  Found _____ C, 62.90; H, 4.80; N, 7.74

E. *m - [3 - (2 - cyanoacetyl - 5 - benzofuran) - ureido]benzaldehyde ethylene glycol acetal*

A mixture of 72 parts of the above acetal ester, 125 parts of acetonitrile and 25 parts of sodium methylate was stirred and heated at gentle reflux for 0.5 hour. Isolation of the reaction product essentially as described in Example I, section E, gave 30 parts of cyanoacetyl acetal melting at 153–158° C. The compound has the formula:

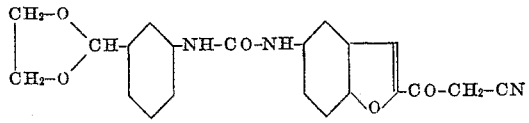

Analysis:
Calcd. for C₂₁H₁₇O₅N₃_____ C, 64.42; H, 4.38; N, 10.74
Found _____ C, 64.62; H, 4.49; N, 10.77

F. *m - [3 - (2 - cyanoacetyl - 5 - benzofuran) - ureido]benzaldehyde polyvinyl acetal*

A mixture of 2 parts of the above cyanoacetyl acetal, 10 parts of polyvinyl alcohol, 0.6 part of o-sulfobenzaldehyde sodium salt, 70 parts of ethylene glycol and 0.9 part of 92% phosphoric acid was stirred at 67° C. for 20 minutes. The polyvinyl acetal was isolated essentially as described in Example I, section F.

G. *Photographic emulsion using m-[3-2-cyanoacetyl - 5 - benzofuran)ureido]benzaldehyde polyvinyl acetal*

A 5% solution of the above polyvinyl acetal in ethanol-water was used to prepare a silver halide emulsion essentially as described in Example I, section G. After coagulating and washing in running water, the silver halide-color-forming polyvinyl acetal was redispersed and coated on film base according to the procedure outlined in Example I, section G. Processing a piece of the exposed photographic film according to the outline in Example I yielded a strong magenta negative image.

EXAMPLE XI

A. *Ethyl 5-nitrothianaphthene-2-carboxylate*

This nitro ester was prepared as described by Fries, Ann. 527, 93 (1937).

B. *Ethyl 5-aminothianaphthene-2-carboxylate*

Iron powder reduction of 90 parts of the nitro ester essentially as described in Example I, section B, gave 66 parts of ethyl 5-aminothianaphthene-2-carboxylate, M. P. 92–94° C.

C. *2-carbethoxy-5-thianaphthene isocyanate*

The isocyanate was prepared by treatment of the above amino ester with phosgene in ethyl acetate essentially as described in Example I, section C. There was obtained 67 parts of 2-carbethoxy-5-thianaphthene isocyanate, B. P. 170–172° C. at 2 mm., M. P. 86–87° C., from 66 parts of the amino ester.

D. *m - [3 - (2 - carbethoxy - 5 - thianaphthene) - ureido]benzaldehyde ethylene glycol acetal*

The urea derivative was prepared by the addition of an ethereal solution of 17 parts of m-aminobenzaldehyde ethylene glycol acetal to an ethereal solution of 25 parts of the above isocyanate essentially as described in Example I, section D. The yield of colorless crystals melting at 197–199° C. was 42 parts.

E. *m-[3 - (2 - cyanoacetyl - 5 - thianaphthene) - ureido]benzaldehyde ethylene glycol acetal*

A mixture of 41 parts of the above acetal, 15 parts of sodium methylate and 100 parts of acetonitrile was stirred and heated at gentle reflux for 1.5 hours. The reaction product was isolated essentially as described in Example I, section E. The yield of air-dried m - [3 - (2 - cyanoacetyl-5 - thianaphthene) ureido]benzaldehyde ethylene glycol acetal was 40 parts. The compound has the formula:

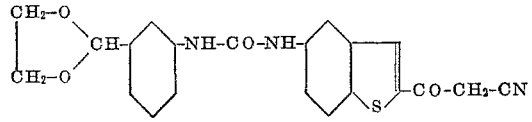

The following illustrates a developing solution containing this color coupler:

SOLUTION A

| | Grams |
|---|---|
| p-Aminodiethylaniline hydrochloride | 0.25 |
| Sodium sulfite (anhydrous) | 1.00 |
| Sodium carbonate (monohydrate) | 2.00 |
| Potassium bromide | 0.20 |
| Water to make 100.00 cc. | |

SOLUTION B

| | |
|---|---|
| m - [3 - (2 - cyanoacetyl - 5 - thianaphthene)ureido]benzaldehyde ethylene glycol acetal___grams__ | 0.20 |
| Potassium hydroxide (10% solution) ___cc__ | 1.00 |
| Methanol ___cc__ | 5.00 |

For use Solution B is added to Solution A.

Development of a piece of exposed silver halide-gelatin emulsion on film base in the above developing formula gives a strong magenta dye image together with a silver image. Removal of the silver image by means of potassium ferricyanide and sodium thiosulfate as described in Example I, section G, gives a bright, magenta negative image.

EXAMPLE XII

A. *Methyl 8 - nitrodibenzofuran - 2 - carboxylate*

To a solution of 23 parts of methyl dibenzofuran-2-carboxylate in a mixture of 25 parts of acetic anhydride and 50 parts of acetic acid was added a mixture of 10 parts fuming nitric acid, 7 parts acetic acid, and 7 parts acetic anhydride, the temperature being maintained at 30° C. After standing for one hour, the mixture was poured onto ice, collected, washed with water, methanol and finally ether. Crystallization from dioxane-water gave faintly yellow crystals of methyl 8-nitrodibenzofuran-2-carboxylate, M. P. 180–182° C.

B. *Methyl 8-aminodibenzofuran-2-carboxylate*

The nitro compound was reduced to the amino ester by means of Raney nickel catalyst at 90–100° C. and at a hydrogen pressure of 800–1000 lbs./sq. in. using dioxane as the solvent for the nitro ester. Removal of the catalyst followed by concentration of the filtrate gave methyl 8-aminodibenzofuran-2-carboxylate.

C. *8-carbomethoxy-2-dibenzofuran isocyanate*

Following the procedure outlined in Example I, section C, 43 parts of the above amino ester yielded 45 parts of 8-carbomethoxy-2-dibenzofuran isocyanate, B. P. 200–205° C. at 2 mm., M. P. 118–122° C.

Analysis:
Calcd. for C₁₅H₉O₄N_____ C, 67.39; H, 3.40; N, 5.25
Found _____ C, 67.95; H, 3.75; N, 5.30

D. *m-[3-(2-carbomethoxy-8-dibenzofuran) ureido]benzaldehyde ethylene glycol acetal*

The addition of an ether solution of 17 parts of m-aminobenzaldehyde ethylene glycol acetal to an ether-methylene chloride solution of 27 parts of the above isocyanate gave 42 parts of m-[3-(2- carbomethoxy - 8-dibenzofuran)ureido]benzaldehyde ethylene glycol acetal, M. P. 186–190° C.

E. *m - [3 -(2-cyanoacetyl-8-dibenzofuran)ureido]benzaldehyde ethylene glycol acetal*

A mixture of 42 parts of the above acetal ester, 100 parts of acetonitrile and 15 parts of sodium methylate was stirred and heated at gentle reflux for 2 hours. The reaction product was isolated essentially as described in Example I, section E. Crystallization of the crude reaction product from acetone gave colorless crystals of m-[3-(2-cyanoacetyl - 8 - dibenzofuran)ureido]benzaldehyde ethylene glycol acetal, M. P. 206–210° C. The compound has the formula:

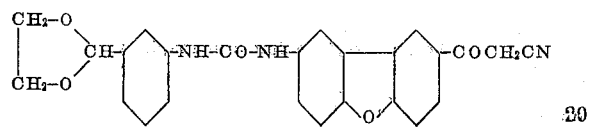

F. *m-[3-(2-cyanoacetyl-8-dibenzofuran)ureido]benzaldehyde polyvinyl acetal*

A mixture of 2 parts of the above cyanoacetyl acetal, 10 parts of polyvinyl alcohol, 0.8 part of o-sulfobenzaldehyde sodium salt, 70 parts of ethylene glycol, 20 parts of dioxane and 1 part of 92% phosphoric acid was stirred at 75° C. for 1 hour. The polyvinyl acetal was isolated essentially as described in Example I, section F.

G. *Photographic emulsion using m-[3-(2-cyanoacetyl - 8 - dibenzofuran)ureido]benzaldehyde polyvinyl acetal*

A 5% solution of the above polyvinyl acetal in ethanol-water was used to prepare a silver halide emulsion essentially as described in Example I, section G. After coagulating and washing in running water, the silver halide-color-forming polyvinyl acetal was redispersed and coated on film base as given in Example I, section G. Processing a piece of the exposed photographic film according to the outline in Example I, section G, gave a brilliant, magenta negative image.

This invention, as indicative above, is generic to the polyhydric alcohol acetals of the formula:

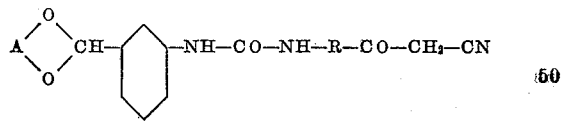

wherein A represents the carbon chain of a monomeric or polymeric polyhydric alcohol and R is a divalent radical, aromatic in character, whose terminal atoms are carbon. The carbon chain of the polyhydric alcohol has the hydroxyl groups which form the acetal on carbon atoms which are either adjoining or separated by one carbon atom. In addition to the various compounds shown in the foregoing examples, other specific acetals which may be mentioned are those in which the aromatic radical attached to the 3-position of the ureido group is

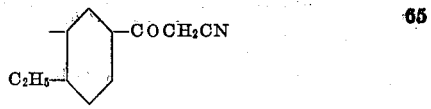

5-cyanoacetyl-2-ethylphenyl

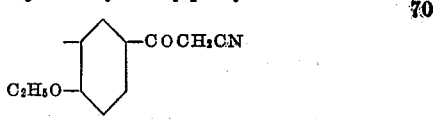

5-cyanoacetyl-2-ethoxyphenyl

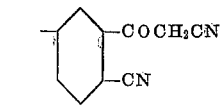

5-cyanoacetyl-4-cyanophenyl

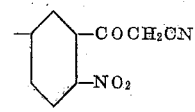

5-cyanoacetyl-4-nitrophenyl

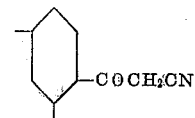

4-cyanoacetyl-3-hydroxyphenyl

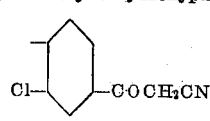

4-cyanoacetyl-2-chlorophenyl

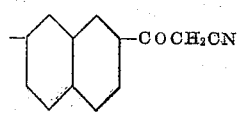

2-cyanoacetyl-7-naphthyl

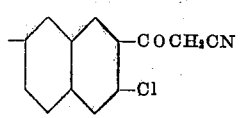

2-cyanoacetyl-3-chloro-7-naphthyl

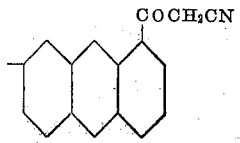

1-cyanoacetyl-7-anthryl

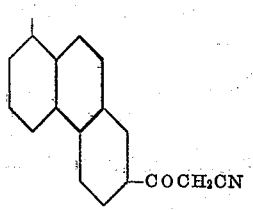

2-cyanoacetyl-8-phenanthryl

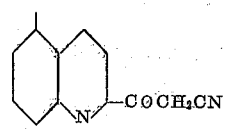

2-cyanoacetyl-5-benzopyridyl

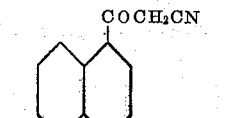

1-cyanoacetyl-4-naphthyl

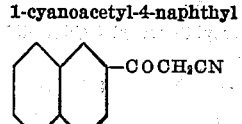

2-cyanoacetyl-4-naphthyl

19

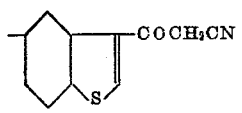
3-cyanoacetyl-5-thianaphthyl

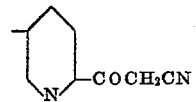
2-cyanoacetyl-5-pyridyl

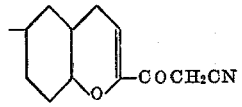
2-cyanoacetyl-6-benzopyryl

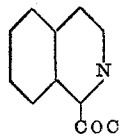
1-cyanoacetyl-6-isoquinolyl

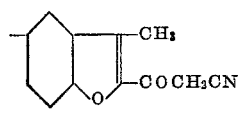
2-cyanoacetyl-3-methyl-5-benzofuryl

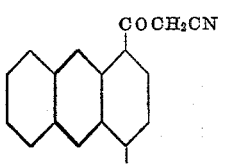
1-cyanoacetyl-4-anthryl

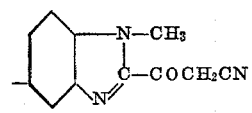
2-cyanoacetyl-3-methyl-6-benzimidazolyl

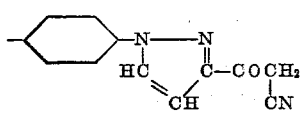
4-(3-cyanoacetylpyrazolyl)phenyl

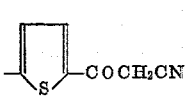
2-cyanoacetyl-5-thienyl

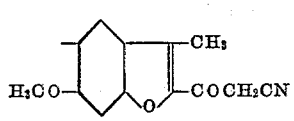
2-cyanoacetyl-3-methyl-6-methoxy-5-benzofuryl

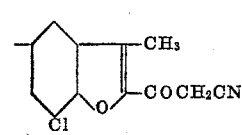
2-cyanoacetyl-3-methyl-7-chloro-5-benzofuryl

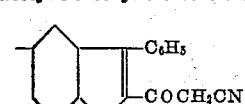
2-cyanoacetyl-3-phenyl-5-benzofuryl

20

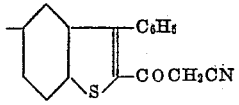
2-cyanoacetyl-3-phenyl-5-thianaphthyl

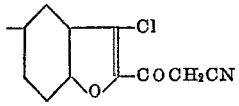
2-cyanoacetyl-3-chloro-5-benzofuryl

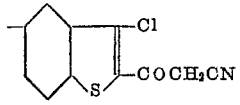
2-cyanoacetyl-3-chloro-5-thianaphthyl

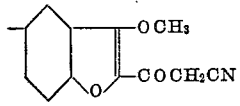
2-cyanoacetyl-3-methoxy-5-benzofuryl

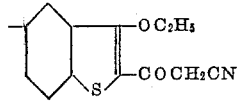
2-cyanoacetyl-3-ethoxy-5-thianaphthyl

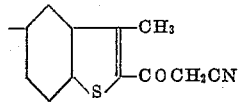
2-cyanoacetyl-3-methyl-5-thianaphthyl

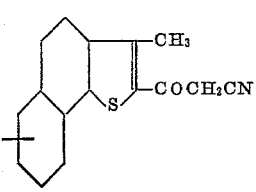
2-cyanoacetyl-3-methyl-6-(or 7, or 8, or 9)-naphtho[1.2-b]thienyl

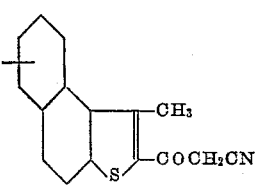
2-cyanoacetyl-3-methyl-6-(or 7, or 8, or 9)-naphtho[2,1-b]thienyl

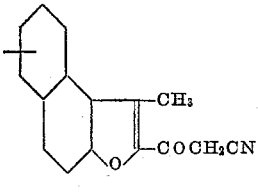
2-cyanoacetyl-3-methyl-6-(or 7, or 8, or 9)-naphtho[2,1-b]furyl

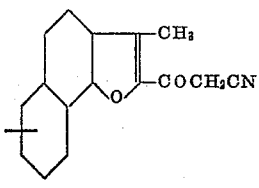
2-cyanoacetyl-3-methyl-6-(or 7, or 8, or 9)-naphtho[1,2-b]furyl

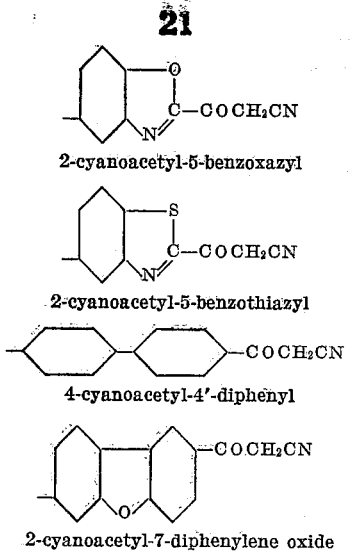

2-cyanoacetyl-5-benzoxazyl 2-cyanoacetyl-5-benzothiazyl 4-cyanoacetyl-4'-diphenyl 2-cyanoacetyl-7-diphenylene oxide and the like. The nature of the radical R and of its substituents, if any, is generally immaterial provided the radical R is aromatic in character and has a cyanoacetyl group attached thereto, since the latter together with the ureido group are the important parts of the molecule.

In general, the most useful compounds of this invention are those in which the radial R is (a) a nuclear structure, aromatic in character, containing a six-membered aromatic hydrocarbon nucleus, e. g., phenylene, alkyl- and aryl-substituted phenylene, naphthylene, anthrylene, or phenylene substituted by halogen, ether, thioether or carbalkoxy groups; or, (b) a heterocyclic nuclear structure, aromatic in character, containing at least one oxygen, sulfur or nitrogen atom in the ring configuration, the remainder of the nuclear structure being carbon and hydrogen. Especially desirable are color-formers which contain a heterocyclic nucleus with the cyanoacetyl group attached to a carbon atom which is in turn attached to at least one oxygen, sulfur or nitrogen atom in the ring configuration. These color-formers have been found to give the most nearly ideal magenta dyes for the three-color subtractive process. Outstanding results are obtained with the compounds in which the radial R contains a benzofuran or a thianaphthene nucleus. Moreover, in the case of the benzofuran nucleus, the substitution of a 3-hydrogen atom by radicals such as alkyl, aryl or halogen gives color-forming acetals of improved stability.

The alcohol portion of the acetal molecule may be any desired polyhydric alcohol. When it is monomeric, it is preferably a dihydric or trihydric aliphatic alcohol of two to four carbon atoms, e. g., ethylene glycol, glycerol, 1,2- or 1,3-propylene glycol or 1,2- and 1,3-butylene glycol and still more preferably an alkanediol of 2 to 4 carbon atoms. When it is polymeric, it may be any completely or partially hydrolyzed polymer of a vinyl carboxylate, particularly a vinyl ester of a monocarboxylic acid of one to four carbons, e. g., vinyl formate, vinyl acetate, vinyl chloracetate, vinyl propionate, vinyl butyrate, etc. The vinyl carboxylate should be sufficiently hydrolyzed so that the groups

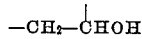

represent at least 50% of the polymer chain, i. e., for every 100 chain atoms there are at least 25 hydroxyl groups. Hydrolyzed interpolymers of vinyl esters with minor proportions (10% or less by weight) of other polymerizable vinyl compounds, e. g., vinyl chloride, methyl methacrylate, etc., may be used, especially when a lower degree of water solubility is desired. In particular, the water-soluble hydrolyzed olefin/vinyl ester interpolymers and especially the hydrolyzed ethylene/vinyl acetate interpolymers described in U. S. Patents 2,386,347 and 2,397,866 are useful. The preferred polyhydric alcohol is polyvinyl alcohol, e. g., substantially completely hydrolyzed polyvinyl acetate, and in particular the polyvinyl alcohols ranging in viscosity from 5 to 50 centipoises in 4% aqueous solution at 20° C.

In the polyvinyl acetals of this invention it is preferred that between 0.75% and 7.5% of the hydroxyl groups of the polyvinyl alcohol be acetalized with the cyanoacetylaryl ureido benzaldehyde. Below 0.75% acetalization, there are insufficient color-forming groups present to give sufficient color strength in a photographic color film. When more than 7.5% of the hydroxyl groups of the polyvinyl alcohol are acetalized, the permeability of the layer to the various solutions used to process the photographic film becomes too low for practical application. The polyvinyl acetals falling within the just defined range are outstanding with respect to top color density, light stability and spectral characteristics in the magenta range on color development with p-amino-diethylaniline type developers. These polymeric compounds are amorphous, high-molecular weight solids which are insoluble in dilute aqueous sodium hydroxide and hot water but are soluble in 10–40% aqueous ethanol.

As illustrated in the examples, an advantageous modification of the invention is obtained when acidic salt-forming groups are introduced into the polymeric acetal by reaction of the polyvinyl alcohol or partial polyvinyl acetal with aldehydes containing carboxylic or sulfonic acid groups. In addition to the o-sulfobenzaldehyde of the examples, which is the preferred aldehydoacid, suitable compounds include phthalaldehydic acid, glyoxalic acid and propionaldehyde beta-sulfonic acid. Desirably, from 0.1% to 5% of the hydroxyl groups in the polyvinyl alcohol are acetalized with such as aldehydoacid.

The cyanoacetylaryl ureido benzaldehyde acetals of this invention may be added to gelatin or other colloid silver halide emulsions as color-formers. The polyvinyl acetals find use as the sole binders for light-sensitive silver halides for photographic color films. The emulsions, however, may contain additional colloids, e. g., the hydroxyl polymers described above, as reactants in the acetalization reactions, e. g., polyvinyl alcohol. They are resistant to bacterial putrefaction and mold and can be stored for longer periods of time under adverse conditions than the conventional gelatin emulsions.

As already noted, this invention also includes as new products the carboalkoxyaryl isocyanates of the formula O=C=N—R—COOR', where R' is the non-hydroxyl portion of a monohydric aliphatic alcohol, and preferably an alkanol of 1 to 4 carbon atoms; the monomeric polyhydric alcohol acetals of carboalkoxyaryl ureido benzaldehyde, i. e., the acetals with a polyhydric monomeric alcohol (preferably a dihydric or trihydric alcohol of 2 to 4 carbon atoms) of aldehydes of the formula:

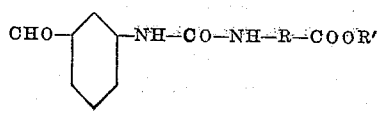

where R' is as above; and the cyanoacetylaryl isocyanates of the formula $$O=C=N-R-CO-CH_2-CN$$

In all of the above formulas the radical R has the significance already mentioned, i. e., it represents a divalent radical, aromatic in character, whose terminal atoms are carbon. The above products are useful as intermediates in the preparation of color-forming cyanoacetylaryl ureido benzaldehyde acetals, and as intermediates in other chemical syntheses.

The invention also includes as an important aspect the photographic silver halide emulsions containing the cyanoacetylaryl ureido benzaldehyde acetals, together with the conventional ingredients which may be present in such compositions, such as sensitizing dyes and the like.

As many widely different embodiments of this invention can be made without departing from the spirit and scope thereof, it is to be understood that the invention is not to be limited except as defined by the claims.

What is claimed is:

1. Acetals of the formula:

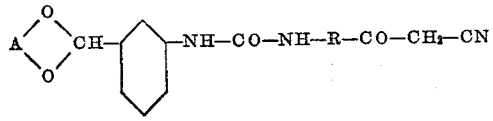

wherein A is the residue of an aliphatic polyhydric alcohol, the carbon atoms of the carbon chain of said alcohol that are attached to the oxygen atoms which are attached to the >CH— group being not more than one carbon atom apart in said chain, and R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyridine ring, and (d) a benzopyridine ring, the free valences of the ring which are attached to —NH— and —CO— being on carbon atoms in the ring, the cyanoacetyl radical attached to R being the sole cyanoacetyl radical present in the acetals.

2. Monomeric acetals of the formula:

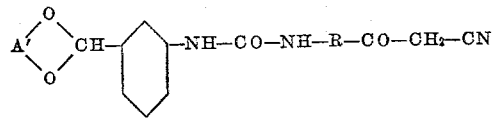

wherein A' is the non-hydroxyl radical of an alkanediol the carbon atoms of which attached to the oxygen atoms are not more than one carbon atom apart in said radical, and R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyridine ring, and (d) a benzopyridine ring, the free valences of the ring which are attached to —NH— and —CO— being on carbon atoms in the ring.

3. Polymeric acetals containing a large number of recurring intralinear $$-CH_2-CHOH$$

groups and a number of intralinear units having a nucleus of the formula:

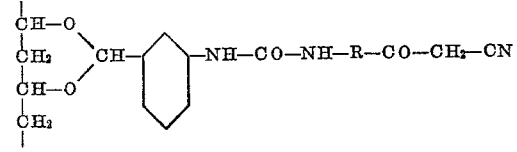

wherein R is a divalent cyclic radical having a ring selected from the group consisting of (a) an aromatic carbocyclic ring, (b) an aromatic carbocyclic ring fused to a ring selected from the group consisting of furane, thiofurane and azole rings, (c) a pyridine ring, and (d) a benzopyridine ring, the free valences of the ring which are attached to —NH— and —CO— being on carbon atoms in the ring, the cyanoacetyl radical attached to R being the sole cyanoacetyl radical present in the acetals.

4. Polymeric acetals containing a large number of recurring intralinear $$-CH_2-CHOH$$

groups and a number of intralinear units of the formula:

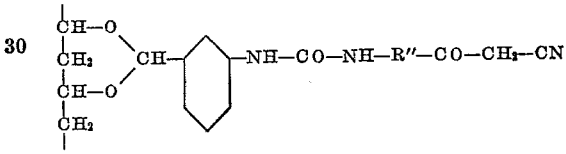

where R'' is a phenylene radical attached in the meta position to —NH— and —CO—.

5. A mixed acetal of m-[3-(5-cyanoacetyl-2-chlorophenyl)ureido]benzaldehyde and sodium o-sulfobenzaldehyde with polyvinyl alcohol, containing intralinear $$-CH_2-CHOH \text{ groups}$$

6. A mixed acetal of m-[3-(2-phenylmercapto-5-cyanoacetylphenyl)ureido]benzaldehyde and sodium o-sulfobenzaldehyde with polyvinyl alcohol, containing intralinear $$-CH_2-CHOH \text{ groups}$$

7. A mixed acetal of m-[3-(2-cyanoacetyl-5-benzofuran)ureido]benzaldehyde and sodium o-sulfobenzaldehyde with polyvinyl alcohol, containing recurring intralinear $$-CH_2-CHOH \text{ groups}$$

8. A mixed acetal of m-[3-(3-carbomethoxy-5-cyanoacetylphenyl)ureido]benzaldehyde and sodium o-sulfobenzaldehyde with polyvinyl alcohol, containing recurring intralinear $$-CH_2-CHOH \text{ groups}$$

9. Monomeric acetals of the formula:

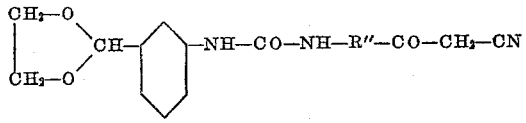

where R'' is a phenylene radical attached in the meta position to —NH— and —CO—.

(References Cited on following page)

References Cited in the file of this patent

UNITED STATES PATENTS

| Number | Name | Date |
|---|---|---|
| 2,272,153 | Moyle | Feb. 3, 1942 |
| 2,320,422 | Frohlich | June 1, 1943 |
| 2,356,480 | Swan | Aug. 22, 1944 |
| 2,380,032 | Dorough et al. | July 10, 1945 |
| 2,399,345 | Goodman | Apr. 30, 1946 |
| 2,418,297 | French et al. | Apr. 1, 1947 |
| 2,423,025 | Holmes et al. | June 24, 1947 |
| 2,439,969 | Forneau | Apr. 20, 1948 |
| 2,445,733 | Radcliff | July 20, 1948 |
| 2,476,264 | Niederhauser | July 12, 1949 |
| 2,489,655 | Martin | Nov. 29, 1949 |
| 2,507,180 | Salminen | May 9, 1950 |
| 2,538,257 | Martin | Jan. 16, 1951 |
| 2,574,506 | Sletzinger et al. | Nov. 13, 1951 |